US008012389B2

(12) United States Patent
Warnes et al.

(10) Patent No.: US 8,012,389 B2
(45) Date of Patent: Sep. 6, 2011

(54) METHOD FOR PRODUCING WOOD FIBRE COMPOSITE PRODUCTS

(75) Inventors: Jeremy Martin Warnes, Rotorua (NZ);
Alan Fernyhough, Rotorua (NZ);
Charles Ross Anderson, Rotorua (NZ);
Brendan James Lee, Rotorua (NZ);
Michael Ralph Juergen Witt, Rotorua (NZ)

(73) Assignee: New Zealand Forest Research Institute Limited, Rotorua (NZ)

( * ) Notice: Subject to any disclaimer, the term of this patent is extended or adjusted under 35 U.S.C. 154(b) by 232 days.

(21) Appl. No.: 12/158,389

(22) PCT Filed: Dec. 22, 2006

(86) PCT No.: PCT/NZ2006/000341
§ 371 (c)(1),
(2), (4) Date: Dec. 1, 2008

(87) PCT Pub. No.: WO2007/073218
PCT Pub. Date: Jun. 28, 2007

(65) Prior Publication Data
US 2009/0264560 A1     Oct. 22, 2009

(30) Foreign Application Priority Data

Dec. 22, 2005  (NZ) ......................... 544493

(51) Int. Cl.
*B27N 3/02*    (2006.01)
(52) U.S. Cl. .................... 264/115; 264/121; 264/122
(58) Field of Classification Search .................... None
See application file for complete search history.

(56) References Cited

U.S. PATENT DOCUMENTS

| | | | |
|---|---|---|---|
| 3,396,142 A | 8/1968 | Little et al. | |
| 3,765,934 A | 10/1973 | Gaylord | |
| 3,869,432 A | 3/1975 | Gaylord | |
| 3,894,975 A | 7/1975 | Gaylord | |
| 3,900,685 A | 8/1975 | Gaylord | |
| 3,943,079 A | 3/1976 | Hamed | |
| 3,949,133 A | 4/1976 | Santurri et al. | |
| 3,958,069 A | 5/1976 | Gaylord | |
| 4,051,214 A | 9/1977 | Casper et al. | |
| 4,414,267 A | 11/1983 | Coran et al. | |
| 4,528,303 A | 7/1985 | Segaud | |
| 4,562,218 A | 12/1985 | Fornadel et al. | |
| 4,612,238 A | 9/1986 | DellaVecchia et al. | |
| 4,717,742 A | 1/1988 | Beshay | |
| 4,791,020 A | 12/1988 | Kokta | |
| 4,820,749 A | 4/1989 | Beshay | |
| 5,064,689 A * | 11/1991 | Young et al. ................... | 427/202 |
| 5,120,776 A | 6/1992 | Raj et al. | |
| 5,153,241 A | 10/1992 | Beshay | |
| 5,183,622 A | 2/1993 | Persson | |
| 5,217,672 A * | 6/1993 | Kelman et al. ................ | 264/517 |
| 5,288,772 A | 2/1994 | Hon | |
| 5,938,994 A | 8/1999 | English et al. | |
| 6,270,883 B1 | 8/2001 | Sears et al. | |
| 6,270,893 B1 * | 8/2001 | Young et al. ................... | 428/372 |
| 6,610,232 B2 | 8/2003 | Jacobsen | |
| 6,695,993 B2 | 2/2004 | Hashemzadeh et al. | |
| 6,939,492 B2 * | 9/2005 | Jackson et al. ................ | 264/116 |
| 7,357,888 B2 * | 4/2008 | Michael ....................... | 264/115 |
| 2002/0098451 A1 | 7/2002 | Arimoto et al. | |
| 2006/0006564 A1 | 1/2006 | Maldas et al. | |
| 2006/0145384 A1 | 7/2006 | Singer | |

FOREIGN PATENT DOCUMENTS

| | | |
|---|---|---|
| EP | 0 235 794 B1 | 9/1987 |
| EP | 0 312 090 B1 | 4/1989 |
| EP | 0 319 589 B1 | 6/1989 |
| EP | 1 070 782 A1 | 1/2001 |
| EP | 1 468 799 A2 | 10/2004 |
| EP | 1 498 241 A2 | 1/2005 |
| GB | 1 010 043 A | 11/1965 |
| GB | 2 192 397 A | 1/1988 |
| JP | 2 269 004 A | 11/1990 |
| WO | 98/48992 A1 | 11/1998 |
| WO | 2005/009701 A2 | 2/2005 |
| WO | 2005/039844 A1 | 5/2005 |

OTHER PUBLICATIONS

A.J. Michell; "Wood Fibres and Plastics", Forestry & Forest Products Newsletter, vol. 4, No. 2, 1990, Autumn CSIRO, Australia, pp. 1-4.
B.V. Kokta, et al; "Composites of Poly(Vinly Chloride) and Wood Fibers, Part II: Effect of Chemical Treatment", Polymer Composites, Apr. 1990, vol. 11, No. 2, pp. 84-89.
D. Maldas, et al; "Surface modification of wood fibers using maleic anhydride and isocyanate as coating components and their performance in polystyrene composites", Journal Adhesion Science Technology, 1991, vol. 5, No. 9 pp. 727-740.
B.V. Kokta, et al; "Composites of Polyvinyl Chloride-Wood Fibers. III: Effect of Silane as Coupling Agent", Journal of Vinyl Technology, vol. 12, No. 3, Sep. 1990, pp. 146-153.
G.E.Myers, et al; "Wood Flour/Polypropylene Composites: Influence of Maleated Polypropylene and Process and Composition Variables on Mechanical Properties", International Journal of Polymeric Materials, vol. 15, 1991, pp. 21-44.
Karl D. Sears, et al; "Reinforcement of Engineering Themoplastics with High Purity Wood Cellulose Fibers", Proc. The 6th International Conference on Woodfiber-Plastics Composites, Forest Products Society, 2001, pp. 27-34.
ASTM International, Designation: D638-03, "Standard Test Method for Tensile Properties of Plastics[1]", pp. 1-15, Mar. 2008.
ASTM International, Designation: D790-03, "Standard Test Methods for Flexural Properties of Unreinforced and Reinforced Plastics and Electrical Insulating Materials[1]", pp. 1-11, Jun. 2007.

(Continued)

Primary Examiner — Mary Lynn F Theisen
(74) Attorney, Agent, or Firm — Ladas & Parry LLP

(57) ABSTRACT

A process for producing a thermoformable fibre-plastics composite product comprising lignolcellulosic or natural fibres, particularly but not exclusively useful as an intermediate product in subsequent manufacture, comprises conveying the fibres in a dry or wet air stream and applying to the fibres a thermoplastic binding agent, and forming the fibres into a solid or semi-solid product such as a panel, which is thermoformable. In at least a preferred embodiment the process may be carried out in known plant for manufacture of medium density fibre board.

24 Claims, No Drawings

OTHER PUBLICATIONS

John Winski; "Feeding Solutions for Wood Plastics Applications", The 6$^{th}$ International Conference on Woodfiber-Plastic Composites, pp. 137-148.

Ceri Loxton, et al; "Resin Distribution in Medium Density Fibreboard, Quantification of UF Resin Distribution on Blowline Blended MDF Fibre and Panels", CanberraResdist, pp. 1-9.

Nicole M. Stark, et al; "Effects of Wood Fiber Characteristics on Mechanical Properties of Wood/Polypropylene Composites", Wood and Fiber Science, 35(2), pp. 167-174, 2003.

Jan H. Schut; "Wood is Good for Compounding, Sheet & Profile", Online article from http://www.plasticstechnology.com/articles/199903fa1.html(1999). North Wood Plastics Inc., 3220 Crocker Avenue, Sheboygan, WI. 53081 USA.

Rosilei A. Garcia[1], et al; "Dimensional stability of MDF panels produced from fibres treated with maleated polypropylene wax", Journal Wood Science and Technology, vol. 39, No. 8/Nov. 2005, pp. 630-650.

* cited by examiner

METHOD FOR PRODUCING WOOD FIBRE COMPOSITE PRODUCTS

FIELD OF INVENTION

The invention relates to a process for producing a thermoformable fibre-plastics composite product comprising lignocellulosic or natural fibres and a thermoplastic binding agent, such as a thin panel, particularly but not exclusively useful as an intermediate product. In at least a preferred embodiment the process may be carried out in known plant for manufacture of medium density fibre board.

BACKGROUND

There are many methods for making thermoplastic or stampable sheet products from reinforcing fibres and polymers. Extrusion of fibres and plastics into a sheet is one common approach. Subsequent compression moulding or thermoforming can then take place to produce consolidated sheets or moulded shapes using matched die moulds. Layered arrangements of polymer films and fibre mats (textile/woven or non-woven) which are subsequently pressed is another route (film stacking or lamination). There are a number of variations around these processes for continuous or semi-continuous or automated processes. Glass fibres are commonly used but others are also used. A relatively common product is GMT (glass mat thermoplastic) composite. GMT composites can be moulded and stamped into a variety of suitable products, for example automotive bumpers. Thus, processes for preparing thermo-mouldable, thermoplastic composite material are already known in the art. For instance, U.S. Pat. No. 949,133 describes processes for preparing slabs from thermo-mouldable composite material obtained by inserting reinforcing fibre layers between the sheets of previously extruded polymer. The panel thus obtained is compressed under heat in a manner such as to allow the molten polymer to penetrate the reinforcing structure.

The reinforcements generally comprise glass fibers and consists of small mats of chopped fibers or of small, monoyarn mats of continuous fibers. Other processes have been suggested such as, for example, those described in GB-A-1 010 043 or U.S. Pat. No. 3,396,142. According to these processes the powdered thermoplastic matrix is fed after the small fibrous mats have been prepared.

EP0235794B1 describes a process which comprises simultaneously and separately feeding the granulated thermoplastic polymer and a reinforcement selected from natural, artificial or synthetic fibers to a conveyor belt and embedding and heating under pressure the structure thus obtained. A beating operation is included for the purpose of enhancing the penetration of the polymer into the reinforcing structure but it also serves to disperse, as much as possible, the multi-filament forming the reinforcing structure into single monofilaments.

EP0312090B1 describes a process of producing a fibrous laminate which comprises laminating a thermoplastic resin fibre binder non-woven fabric (A) having a melting point of from 60 to 200C. on the surface of a fiber mat (B) composed of synthetic or natural fibres, said synthetic fibers or natural fibers having a melting point of at least 40C higher than the melting point of the aforesaid fibre binder non-woven fabric, applying needling to the laminate from the side of the thermoplastic resin fibre binder non-woven fabric (A), whereby the binder fibres of the non-woven fabric (A) and the fibres of the fibre mat (B) are entangled with each other to provide a laminate mat (C), placing a surface decorating material (D) on the surface of the non-woven fabric (A), and heating the laminate to a temperature of not melting the surface decorating material (D) and the fibres of the fibre mat (B) but melting the binder fibres of the non-woven fabric (A) to weld the surface decorating material (D) and the laminate mat (C) in a body.

Della Vecchia et al, in U.S. Pat. No. 4,612,238, discloses a process for producing a laminate that combines a layer of resin, a glass mat, another layer of resin, a second glass mat, and a third layer of resin. The first and third layers of resin, which are thermoplastic materials, can be so selected to obtain desired properties. Various quantities of reinforcing materials, fillers and additives can be included in selected proportions.

There is increasing interest in wood and natural fibre utilisation in plastics. Primarily this has been focussed on extrusion based processing, though sheet pressing or thermoforming methods have also been reported and developed. A J Mitchell (1990; Forestry & forest Products, Newsletter, Vol 4, No 2, Autumn CSIRO, Australia, pp 1-4 describes common approaches to wood fibre plastic sheet manufacture. Examples described include dry formed wood fibre sheets with plastics, wood fibre sheets prepared by organic solvent based impregnation, wood fibre sheets impregnated by dipping with emulsions in water, and molten polymer impregnated sheets and yarns. U.S. Pat. No. 4,562,218 describes formable pulp compositions from aqueous wood and natural fibre slurries.

Drawbacks of the above-mentioned processes often include poor economy in that the reinforcement may be relatively expensive or expensively produced and its mat or web has to be prepared separately from the fibre production, or a separate drying process or impregnation is required, or the methods of combination of wood or natural fibres with the polymer matrix/compositions are inconvenient and there are difficulties in handling of short or low bulk density fibres.

Plastic and wood, or plastic and natural fibres, do not mix easily, although some polymers are more compatible than others are. PVC, which is polar like wood, reportedly bonds to, or interacts well with, the filler or fibre without special alloying or coupling agents, whereas polyolefins (polypropylene and polyethylene) do not adhere to wood as well as PVC, and so such wood-plastics requite modification to get the best level of performance from the filler or fibre in the plastic. One example of the current state of technology is to add a coupling agent, often a maleated polyolefin for polyolefin based composites, into the extruder and mixing within the extruder. The prior art contains numerous suggestions regarding polymer fibre composites. Gaylord, U.S. Pat. Nos. 3,765,934, 3,869, 432, 3,894,975, 3,900,685, 3,958,069 and Casper et al., U.S. Pat. No. 4,051,214 teach a bunk polymerization that occurs in situ between styrene and maleic anhydride monomer combined with wood fibre to prepare a polymer fibre composite. Segaud, U.S. Pat. No. 4,528,303 teaches a composite composition containing a polymer, a reinforcing mineral filler and a coupling agent that increases the compatibility between the fillet and the polymer. The prior art also recognizes modifying the fibre component of a composite. Hamed, U.S. Pat. No. 3,943,079 teaches subjecting unregenerated discontinuous cellulose fibre to a shearing force in shear mixers, resulting in mixing of a polymer and a lubricant material with the fibre. Such processing improves fibre separation and prevents agglomeration. Similarly, Coran et al., U.S. Pat. No. 4,414, 267 teaches a treatment of fibre with an aqueous dispersion of a vinyl chloride polymer and a plasticizer, the resulting fibres contain a coating of polyvinyl chloride and plasticizer and can be incorporated into the polymer matrix with reduced mixing energy. Beshay, U.S. Pat. Nos. 4,717,742 and 4,820,749 teach a composite material containing a cellulose having grafted silane groups. Raj et al., U.S. Pat. No. 5,120,776 teach cellulosic fibres pre-treated with maleic or phthalic anhydride to improve the bonding and dispersibility of the fibre in the polymer matrix. Raj et al. teach a high density polyethylene chemical treated pulp composite. Hon, U.S. Pat. No. 5,288,772 discloses fibre reinforced thermoplastic made with a moisture pre-treated cellulosic material such as discarded newspapers having a lignin content. Kokta et al., "Composites of Poly(Vinyl Chloride) and Wood Fibres. Part II. Effect of Chemical Treatment", Polymer Composites, April 1990, Volume 11, No. 2, teach a variety of cellulose treatments. The treatments include latex coating, grafting with vinyl monomers, grafting with acids or anhydrides, grafting with coupling agents such as maleic anhydride, abietic acid (See also Kokta, U.K. Application No. 2,192,397). Beshay, U.S. Pat. No. 5,153,241 teaches composite materials including a modified cellulose. The cellulose is modified with an organo titanium coupling agent which reacts with and reinforces the polymer phase. Maldas and Kokta, "Surface modification of wood fibres using maleic anhydride and isocyanate as coating components and their performance in polystyrene composites", Journal Adhesion Science Technology, 1991, pp. 1-14 show polystyrene flour composites containing a maleic anhydride modified wood flour. A number of publications including Kokta et al., "Composites of Polyvinyl Chloride-Wood Fibres. III: Effect of Silane as Coupling Agent", Journal of Vinyl Technology, Vol. 12, No. 3, September 1990, pp. 142-153 disclose modified polymer (other references disclosed modified fibre) in highly plasticized thermoplastic composites. Additionally, Chahyadi et al., "Wood Flour/Polypropylene Composites: Influence of Maleated Polypropylene and Process and Composition Variables on Mechanical Properties", International Journal Polymeric Materials, Volume 15, 1991, pp. 21-44 discuss polypropylene composites having polymer backbone modified with maleic anhydride.

Consequently much importance is placed on the coupling of wood or natural fibres with polymer matrices in composites and in particular in thermoplastic-wood composites. The present invention offers the possibility of introducing compatibilisers, which can also function as binders and/or as components of the plastic matrix (depending on loading) by applying the methods of the MDF and related processes.

It should be noted that although many publications refer to wood fibres, in reality they are essentially wood flour or powders, or flakes, or saw-dust etc rather than fibres with a reasonable aspect ratio (10:1 or 20:1 or more) and for example typically have an average length of less than 0.8 mm or 1 mm. For the purposes of the current invention fibres are the products of MDF type processes as described herein and in other publications, or are mechanical or thermomechanical pulping or high temperature mechanical pulping or other similar refining processes or processes incorporating such refining processes as one stage and can, optionally, include chemical or biological pulping stages. Such fibres will have average fibres of ~1 mm or more, though of course may contain fines or fibres of lower lengths as components. Accordingly, a substantial need exists for improved processes to introduce wood or other natural fibres, for example with an aspect ratio greater than 10:1 or 20:1 or with an average fibre length of, say, 0.8 mm or 0.9 mm or 1 mm or more (as opposed to wood flout or powders or flakes) into plastics in the form of composite products which are sheets, impregnated mats, prepregs, boards, films, laminates or profiles or moulded products or shapes machinery, and, also, optionally for compatibilising formulations or materials for combining thermoplastic polymer(s) and wood or natural fibre(s) and also, again optionally, for introducing functional additives into the fibre-plastic combination.

In other prior art, Sears et al (Sears K. D et al, 2001. Proc. 6$^{th}$ International Conference on Woodfibre Plastics Composites, Forest Products Society, 2001, p 27-34 and U.S. Pat. No. 6,270,883.)) describe the use of fibres with an alpha cellulose content purity>80% indicative of pulps which are usually kraft or chemically pulped and not ordinarily available or manufactured by an MDF type process ie via mechanical or thermomechanical pulping methods such as used in the present invention. These and related methods use liquid immersion or dip-coating or slurries for impregnation of fibres rather than MDF and related processes, which are better suited to low cost continuous manufacturing processes.

Medium density fiberboard (MDF) uses a high temperature thermomechanical pulp fibre to produce large panels for a variety of applications, such as furniture or internal mouldings. MDF takes much of its characteristics from the fact that it uses wood cells (tracheids, vessels, fibres and fibre-tracheids), rather than particles. Below is a description of aspects of one variation of a process for MDF manufacture. A Masonite gun Process, Atmospheric or Pressurised Disk refiner is used and for example, the Asplund defibrator pressurized disk refinement is commonly used in MDF manufacture. The chips are compacted into small plugs which are heated, to soften the wood, and then fed into the defibrator where high temperatures are often applied to defibrate wood. The pulp may pass through a secondary refiner or other stages. The resulting pulp is light, fine, fluffy and fibre walls are largely intact. After defibration fibres may enter the blowline and usually the fibres pass through at high velocity. Wax, often used to improve the moisture resistance of the finished product is sometimes added, and resin is added, usually in the blowline while the fibres are still wet. The blowline feeds into a tube drier further into the process and fibres are dried, for example by hot air heated from a boiler or via heating coils warming the blowline. Agitation of fibres in the blowline helps disperse resin consistently. The fibres exit warm-hot and may be stored in bins for an unspecified length of time, though often less than 30 minutes, and the board making process is usually continuous from here on. The moisture content of the fibres is often ~12% and considered a dry process.

The blowline mixing process and the use of dry fibres are distinguishing characteristics of MDF. A continuous (usually but not essentially) and consistent mat is formed from the flowing fibre stream (at considerable air velocities) and one way of achieving this is a Pendistor wherein impulses of air act on the fibre as it falls down a shaft to a conveyor or to a vacuum box at the start of the conveyor belt that carries the mat. The oscillatory action on the fibres spreads them uniformly into a mat and they begin their run on the conveyor belt at selected thicknesses. The mats are them pressed, with heat, to certain thicknesses or density profiles.

Due to the commercial scale of these operations and the use of heat to soften the fibres, MDF fibre is a low cost form of wood fibre. Additionally, it has an aspect ratio to allow reinforcing of composites (for example radiata pine approx 2.5 mm×30 µm). In the MDF process a thermosetting resin, typically urea-formaldehyde (UF) or related formaldehyde crosslinking resins, or other resins such as isocyanate resins, is added to the fibre, with the fibre in a wet state, while it is exiting the refiner in the blowline. This gives extremely high surface coverage of the fibre at low resin loadings. The MDF or particle board type processes would not be usually associated with producing a thermoplastic or reformable product or a resin or polymer rich sheet. Ordinarily it produces a sheet product which is fibre-rich and bound with a rigid, cured, thermoset resin which is not readily thermoplastically processable or reprocessable or easily usable or useful in thermoplastic processes.

OBJECT OF THE INVENTION

It is an object of the invention to provide an improved or at least alternative process for producing a thermoformable fibre-plastics composite product.

SUMMARY OF THE INVENTION

In broad terms in one aspect the invention comprises a process for producing a thermoformable fibre-plastics composite product comprising fibres of a lignocellulosic material or natural fibres, comprising:
   conveying loose or divided fibres or fibre bundles, produced by mechanically or thermomechanically or chemo-thermomechanically or chemo-mechanically breaking down a lignocellulosic material, or natural fibres, in a dry or wet air stream and applying to or intimately mixing with the fibres while so conveying the fibres sufficient of one or more thermoplastic binding agents in a liquid or particulate form to enable, after subsequently forming the fibres into a solid or semi-solid product, said product to be thermoformed to a different shape, and
   so forming the fibres into a solid or semi-solid thermoformable product.

In broad terms in another aspect the invention comprises a process for producing a thermoformable particulate-plastics composite product comprising particles of a lignocellulosic material or natural material, comprising:
   conveying particles of a lignocellulosic material, or natural material, in an air stream and applying to or intimately mixing with the particles while so conveying the particles sufficient of one or more thermoplastic binding agents in a liquid or particulate to enable, after subsequently forming the particles into a solid or semi-solid product, said product to be thermoformed to a different shape, and
   so forming the particles into a solid or semi-solid thermoformable product.

In one form the process includes subsequently heating and thermoforming said product to thereby after the shape of the product. For example the step of so forming the fibres or particles into a solid or semi-solid thermoformable product may comprise forming the fibres or particles into a substantially planar panel, and including the subsequent step of heating and thermoforming said panel or a part thereof into a non-planar shape.

In another form the step of so forming tie fibres or particles into a solid or semi-solid product may comprise directly forming the fibres or particles into a product having a non-planar shape. The fibres or particles may be formed directly into a predetermined product shape useful in manufacture without requiring further thermoforming.

In one form the process includes introducing the binding agent in a liquid form into the interior of the conduit as the fibres or particles move through the conduit, to coat or partially coat the fibres. he binding agent in a liquid form may be sprayed or poured into the interior of the conduit or introduced into the conduit as a molten flow, for example, as the fibres move through the conduit, to coat or partially coat the fibres.

In another form the process includes introducing the binding agent in a particulate form into the conduit by blowing the particulate into the interior of the conduit as the fibres or particles move through the conduit, to mix intimately with the fibres.

Typically the process can be operated by an MDF or particleboard or hardboard or similar manufacturing plant with relatively minor plant changes if any.

Preferably the conduit conveys the fibres from a refiner stage in a plant for manufacture of fibre board.

Preferably the conduit conveys the fibres to or from a drying stage or drier.

Preferably the process includes pressing the fibres between heated platens or toilers.

Preferably the fibres are wood fibres and have an average fibre length or fibre-bundle length of at least about 0.8 mm, more preferably at least about 1 mm.

Preferably a major fraction of the fibres have an aspect ratio of at least 10:1, more preferably at least 20:1, and most preferably at least 25:1.

Preferably the binding agent comprise(s) a polymer, monomer, oligomer, or polyolefin having a melting point below 230° C., or below 200° C.

Preferably the fibres are dried prior to a pressing stage to a moisture content of 12 wt % or lower and more preferably to 8 wt % or less.

Preferably a hot-pressing cycle for sheet or moulded product formation is optimised to also remove further moisture or volatiles, if necessary, by dwells or stages of hot-pressing or bumping.

Additional polymer and/or additives maybe applied as a liquid formulation—which is a neat liquid or is an aqueous solution, dispersion or emulsion—or as a powder, or as a fibre, at another point in the process and preferably immediately prior to, or during, a fibre mattress assembly stage.

In a further form the invention comprises a process for producing a thermoformable composite product comprising fibres or particles of a lignocellulosic or natural material, which includes the steps of:
   conveying loose or divided fibres or fibre bundles, produced by mechanically or thermomechanically or chemo-thermomechanically or chemo-mechanically breaking down a lignocellulosic material, or natural fibres, or particles of a lignocellulosic or other natural material, in a dry or wet air stream and applying to or intimately mixing with the fibres or particles while so conveying the fibres a thermoset binding agent, and
   so forming the fibres or particles into a solid or semi-solid product at a temperature which only partially cures the thermoset binder such that the product can subsequently be formed to a different shape with heat which will further cure the thermoset binder.

The term 'comprising' as used in this specification and claims means 'consisting at least in part of', that is to say when interrupting independent claims including that term, the features prefaced by that term in each claim will need to be present but other features can also be present.

DETAILED DESCRIPTION OF PREFERRED FORMS

Typically the invention includes impregnating or coating or binding wood and/or other natural fibres, such as cellulose based fibres, with a dispersed or dissolved polymer and/or a polymer powder system then pressing or consolidating or shaping tie impregnated fibres under pressure, and preferably at elevated temperature, into sheet or mat wherein the fibres are held together largely by the binder to produce a product which can subsequently be reformed, shaped, or moulded with heat ("thermoformed" or used directly in a laminate or composite structure.

The pre-coated or impregnated wood or other natural fibre composite products, such as sheets, impregnated fibre mats, may be useful in subsequent (in-line or off-thermoplastic processes (pressing, shaping, stampable sheets, prepregs) or as cores or layers or components in thermoplastic or thermoset laminates, or other thermoset composites using liquid composite moulding or other composites or lamination manufacturing routes. In particular, the invention relates to a method for producing wood or other natural fibre products using fibres such as obtained from a thermo-mechanical pulping process, during, or after, which the fibres are treated with a coating or binder system, applied via a solution or dispersion or powder dispersion to a flowing or moving fibre stream, in air or steam, such as in a blowline. Such coating or binder substantially holds the fibres together when formed or pressed or heated into a profile or sheet or other shape, and which is subsequently thermoplastically processable or can be formed into another shape or product or can be used in thermoset composites manufacturing.

The process may also include pre-coating or partially pre-coating or pre-compatibilising wood or other natural fibres, or introducing other functional materials on, in, or close to, such fibres, which can then be processed into a convenient sheet or impregnated mat or feedstock material for use in plastic processing such as sheet pressing, film stacking, press moulding, laminated sheet manufacture, and laminated or blending with sheets or films or laminates of plastics and other materials, especially in thermoplastic processes such as compression moulding.

The invention provides a method for producing wood fibre plastic sheets which are thermoplastically processable. Preferably thermomechanical or thermo-mechanically refined pulp or chemo-mechanical pulp, or chemo-thermomechanical pulp, wherein optional pre-digestion of fibres or chips can occur before entering the fibre refiner, is used as the fibre. More preferably high temperature thermomechanical pulp, such as medium density fibreboard fibre (MDF fibre) is used. Thus, one embodiment of this invention uses modified MDF (medium density fibre board) processes to overcome the difficulties and issues highlighted above in manufacturing wood or other natural fibre sheet or moulded products in a cost-effective way suited to high volume throughput which can simultaneously overcome other difficulties in for example, fibre-drying and fibre-plastic compatibility and/or introduction of additives.

In one embodiment, the fibre has a binder added in the blowline or other facility for spraying or distributing polymer dispersions or solutions onto fibres. Preferably, the binder is a thermoplastic polymer, or comprises a thermoplastic polymer as one component. The binder may be in aqueous solution or an emulsified or aqueous polymer dispersion or comprise a formulation of ingredients which is a dispersion, emulsion or solution or a neat liquid or is a powder. Any polymer which can be dissolved or dispersed in water, or modified or formulated to form or be part of a stable dispersion, or polymerisable resin system, in water may be used. Alternative solutes or dispersion media may be used such as alcohols or other organic solvents, but water is the preferred medium, either alone or in admixture with other co-solvents. Latexes may be used. Dry or neat polymer powders may also be used under varying conditions and low melting waxes or polymers or blends, as high or 100% solids, may also be used according to viscosity and tack requirements of the application apparatus such as spray gun/nozzle. Heated tubing and heated nozzles may be used to aid introduction of such materials.

The polymer binder or additives can be added in the refiner or in the bowline or in the drier or at any point, prior to or after any of these stages in the tubes or pipes or drums or other vessels which convey or transfer fibre continuously in the process. The polymer/additives may be applied to wet fibres or dried fibres or to fibres with equilibrium or near equilibrium moisture content (EMC, typically of the order of 12 wt % moisture). The polymer coating is added to the flowing fibre stream, which may contain bundles or fines, and which are entrained in air or high humidity air, at any point of the MDF process, or related fibre-refining—impregnation manufacturing processes. Additional polymer powder and/or films and/or liquids or dispersions), which may be the same or different to that already applied, may be applied in subsequent stages of the process either to the flowing fibre stream, or at, or close to the fibre mattress assembly/pressing stage.

Preferred polymers as additives such as for the binder and/or compatibiliser and/or added matrix (which may the same or different) are polymers which can be processed as a thermoplastic substance or elastomers and are herein classified as thermoplastic substances and constitute a preferred subclass of plastic polymers. Examples of elastomers suitable for the preparation of concentrates of this invention are natural rubber, styrene-butadiene rubber (SBR), ethylenepropylene rubber (EPR), ethylene-propylene terpolymer (EPDM), acrylonitrlle butadiene rubber (NBR), ethylene-vinylacetate copolymer, silicone rubber, polybutadiene rubber, cis-polybutadiene, trans-polybutadiene, neoprene, polyisoprene and butyl rubber, sulfur-vulcanizable diene rubbers. Diene rubber includes rubber of both low and high unsaturation, the unsaturation being either in a side chain or in the backbone of the polymer and either conjugated or non-conjugated.

Examples of other suitable polymers include acrylate polymers, urethane polymers, chlorosulfonated polyethylene, polyvinyl chloride, halogenated polyethylene, polystyrene, polyvinyl acetate, polyvinyl alcohol, polyvinyl pyrrolidone, acrylonitrile butadiene-styrene terpolymers (ABS), styrene-maleic anhydride copolymers and esterified or other derivatives, polyamides, polyesters, or copolymers of vinyl acetate, copolymers of olefins (ethylene, propylene, . . . ) with unsaturated acids such as acrylic or methacrylic acid or maleic anhydride or with vinyl alcohol or vinyl esters, polyvinyl ethers and copolymers of vinyl ethers, starches and starch derivatives, cellulose esters and cellulose derivatives, polycaprolactone, polylactic acid, polyhydroxyalkanoates, proteins, polyacids, polyanhydrides, polyisocyanates, polyols/polyethers, and copolymers or terpolymers and the like, containing the monomers of such polymers. Mixtures comprising one or more of the above are also suitable. Other oligomeric or reactive resin systems such as epoxy resins, acrylics, unsaturated polyesters, urethane/isocyanate resins, formaldehyde cure resins such as urea-formaldehydes, melamine-formaldehyde, phenol-resorcinol resins, phenolic resins, and related or hybrid systems may also be used. In the process of the invention, resins such as those above or others may be formulated and used as the polymer and/or additives. Thus the added polymer(s) or additives may include reactive monomers or oligomers with reactive groups, applied as aqueous dispersions, emulsions or as neat liquids or molten media.

In a preferred embodiment the binder may also act as a compatibiliser for the fibre and bulk matrix plastic in tie end composite, and, thus, the present invention allows a compatibiliser to be added to the fibre and binder in the blowline to afford greater bonding between polymers and wood fibre. The compatibiliser can be any of the polymers above or their mixtures or blends and can be, or contain, other added materials also. It may be a formulated or reactive polymer system. For polyolefin matrix end composites it is preferably a maleated or acid functional copolymer, such as maleated polyproplyene. Preferably the compatibiliser is an emulsified or dispersed polymer or one dissolved in water but may also be a powder. Thus ethylene or propylene or butene (and the like) co- or ter-polymers also containing—maleic anhydride or ester derivatives of maleic anhydride, or acrylic acid or acrylic esters or ethyene-vinyl acetate co- or ter-polymers are preferred polymers for use in polyolefin and other polymer composites. A combination of emulsified or dispersed or dissolved polymer/compatibiliser applied to fibres (also acting as binder) and also added as a dry powder in with the thermoplastic powder addition is also able to be used and is a preferred approach for some composite sheet or product. For example an emulsion or dispersion of a polymer such as polypropylene or polyethylene or polystyrene also containing an acid bearing comonomer such as maleic anhydride or acrylic aid or other functional copolymer can be applied to the fibres in the MDF process eg blowline and added thermoplastic polypropylene (or polyethylene or polystyrene)) powder or fibres can be added later either to the flowing emulsion coated fibres or at the mattress assembling stage prior to pressing.

The process of the invention provides a convenient, cost-effective way to manufacture sheets or moulded/pressed products directly from a wood fibre source (generating MDF fibre and related fibres) with common plastic matrices such as polyethylene, polypropylene, polystyrene, polyesters including or biopolyesters (such as polylactic acid), or other bioplastics.

As another embodiment the emulsion or dispersion or powder coated fibres may be pressed or lightly pressed or dried in the press and then thermoplastic polymer films or powder or fibres added, or combinations thereof, added prior to undertaking further pressing (s) under heart and/or pressure. Repeats of this process and associated variations may be applied to generate laminated or multi-layered structures. Such structures which may also include different polymers including the example anhydride or acid or other functional copolymers as tie layers applied to the fibres and/or as powders, fibres or films at the mattress assembly/pressing stage, optionally with homopolymers as outer layers and/or intermediate layers again applied as powders fibres or films or mixtures thereof If polymer films are used in the products they can be continuously fed from conveyors and included as part of the sheet and integrated with the MDF process. They can help to carry the fibre or fibre-polymer mixtures to or through the pressing stages. The films maybe applied at the mattress assembly or pressing stage and may be used to make laminate structures.

Thermoformable products may also be produced using thermoset resins which may be used as binder and matrix wherein the thermoset is still uncured or not fully cured to a state which prevents thermoplastic deformation or moulding or is present a low levels compared to a thermoplastic polymer added at the same time, or at different or a later stage or point of addition in the process. Completion of thermoset cure can be during the pressing stage, or in the subsequent stage such as a post cure, either in or off line. Additionally high resin content (more than 12 wt % resin solids and preferably 20 wt % or more resin solids) MDF type composites may be produced by the process of the invention by applying powders or resin dispersion, solutions, liquids (neat) as fine sprays or as particles or as fibrous strands at a second point in addition to normal resin addition points and loadings in the MDF type processes, and such additional resin may, for example, be applied at the mattress assembly or pressing stage. Thermoset powder coating formulations or modifications thereof are useful or preferred polymer systems for such additional thermoset polymer delivery.

All conventional thermoset resins commonly used in MDF or particleboard or powder coating products or processes may be used including polyvinyl acetates, urea-formaldehyde resins, phenol-formaldehyde resins, melamine formaldehyde resin, tannin-formaldehyde or other formaldehyde based resins, isocyanate or urethane resins, furan or furfural resins, other urea, melamine, phenolic or tannin resins, and related hybrids or mixtures thereof. Other resins are able to be applied as powders or as aqueous dispersions or neat liquids and include as example epoxy resins, polyesters, vinyl esters, acrylics and maleimides. In one embodiment using thermoset resins a thermoset moulded product or sheet may also be produce which his different from conventional MDF sheets in achieving high resin loadings in wood fibre sheets or moulding via the MDF process as modified or used herein and applying the processes and concepts of the invention. This may be achieved, for example, by applying additional thermoset resin powder (the same or different from that applied wet or as a powder in the blowline or at other points of the flowing fibre stream) at the mattress assembly or pressing stage. The multi-stage pressing or multilayer approach or product may also be used as described above.

In particular cellulosic or ligno-cellulosic fibres are preferred especially from natural origins such as wood (all types), plant or crop fibres (hemp, straw, wheat, flax, NZ flax, corn, coconut, grasses, kenaf, jute, sisal, ramie, kudzu, . . . ) and animal fibres such as wool/keratin, other protein fibres. Often such fibres have low bulk densities and are entangled or curled fibre bundles and are difficult to handle in usual plastics or composites processing.

Thus the present invention provides a solid panel, sheet or profile by compacting, for example with heat and pressure in a press, the fibre wetted with added polymer. Preferably a hot press is used to compress the fibre into a solid panel or sheet. The panel can be produced as a pre-compatibilised fibre polymer combination which can then be readily used in subsequent plastics or composites processing, usually with pre-drying.

In one aspect, the invention provides a method of producing and compressing wood or natural or plant fibre into a form suitable for re-shaping or reprocessing via conventional or well known thermoplastic methods. The invention uses a press, for example a traditional MDF process or other refining process, to produce wood fibre from wood or natural plant fibre from plants, and the additives are applied during the MDF process for example in the blowline and/or refiner and/or other stages in the MDF process or related processes. The fibre-additive blend is dried and formed into a mat before pressing in a tradition MDF press to produce sheets. The sheets are subsequently used as is or reformed or moulded in plastics processing equipment. For example the sheets can be pressed into different shapes or bonded or fused to other sheets, films, sheet.

Compression or shaping of the fibre-polymer combinations may be carried out by means of conventional compression moulding or thermoforming or vacuum forming or via use of calenders, or via roll-forming methods or indeed via combinations of such processes, which will essentially shape-form or compress or lower the thickness of, the fibre-polymer combination and which may also be carried out in a controlled manner, such as compressing to selected thicknesses, to leave residual porosity if so desired.

To allow the MDF fibre to remain consolidated after pressing, a binder, preferably a thermoplastic binder or additive mixture, is added, for example into the blowline, shortly after fibres are formed in the process, or at another convenient point of addition. Alternatively the fibres may be collected from the refining process and subsequently turbulently reflowed in a stream, then sprayed or impregnated with binder/additive polymer solution or dispersion or powder. The additives may be added at more than one point in the process and in fact different additives can be introduce at different or separates stages. The binding polymer can be added at low loadings solids on fibre, and not cause compatibility problems with any final polymer with which it may be combined with. Preferentially the binder will act to improve compatibility between the fibre and bulk plastic matrix and also bind the fibres. The binder may also serve as the bulk matrix depending on loading Thus, a further aspect to the invention is the addition of compatibilisers in the blowline or at other convenient stages in the process, designed to improve the compatibility and binding between wood or other fibres and the thermoplastic matrix the fibre will eventually be blended with. Blending polymers with fibres in a MDF blowline gives better surface coverage of fibres than blending dry fibres with polymer at ambient conditions. As the blowline operates at elevated temperatures and moisture contents, it is preferable that the compatibiliser is in the form of an emulsion or dispersion in water or is a powder which can wet, or mix well with, or coat, wet wood or natural fibres. Neat liquids or low melting solids eg waxes may thus also be used if able to be sprayed into fine particles. Preferentially the binder coated fibres are pressed under heat to form a sheet with sufficient integrity to withstand reforming or remoulding. This may also impart or retain intimate mixing, contact or bonding of the binder/compatibiliser with fibre and/or remove some of the moisture.

The process may typically be performed in many conventional MDF or particleboard mills wherein fibres are refined and impregnated in blowline or similar facilities, pressed under heat, but, in the process of the invention, can then be slitted and used as is or chopped into smaller sheets, tapes shapes etc and, preferentially, the binder resin is a resin system which is, or is compatible with, the ultimate thermoplastic matrix of choice and processable in plastics machinery such as extrusion or injection moulding. Thus, it is feasible that conventional MDF or similar mills, or their products, could be adapted to produce wood or natural fibre composites for plastics moulding processes, to make fibre-plastic composite parts or products or to make such products directly in the pressing stage of the MDF process. The binder or fibre pre-coating composition may be a formulation of one or more polymers and may also comprise other additives such as stabilisers, plasticisers, process aids, flame retardants, adhesion promoters, colourants, lubricants, anti-static agents, bioactives, liquid additives or solids difficult to introduce into the extruder or required at low levels overall and may also include reactive or functional resins such as epoxy resins.

The pressing of the intermediate sheets can be carried out according to a range of sheet densities. Pre-patterning or imprinting of the sheets can be carried during or after sheet manufacture out to aid the subsequent processes. As described elsewhere in this application pressing can be carried out in stages, some of which may aid in the further drying of the fibre-polymer mixtures, and also used to prepare multilayer structures.

The sheet products of the invention may also be chopped into other shapes or machined into parts and may also be chopped into pellets for subsequent extrusion or injection moulding, either directly alone or admixed with other plastics or fibre or fibre-plastic mixtures.

The examples below illustrate the invention, though they are not to be considered in any way limiting and modifications can be made with respect to the invention by one of ordinary skill in the art.

EXAMPLE 1

Materials

The MDF fibre used was produced at the New Zealand Forest Research PAPRO pilot plant refiner from *Pinus Radiata* toplog using processing conditions to mimic commercial MDF fibre. The fibre was air dried to approximately 10-15% moisture content before storage in plastic bags. Where polypropylene (PP) pellets were used they were Hyundai Seetec grade M1600 with a melt index of 25.

Michem MAPP emulsion is a dispersion of acid-modified polypropylene or maleic anhydride—propylene copolymer at 40% solids.

Sample Production

Methods

Sheets were made from MDF fibre (as a representative fibre) and PP (as a representative polymer) in various ways. Calculated ratios of MDF and Polypropylene (PP) were prepared for a target sheet weight according to target density.

MDF fibres (with/without a precoating of an emulsion coating applied as a spray, via a nozzle or spray gun, in or onto a flowing mass of MDF fibres in air, along conveying tubes (under air pressure; in a laboratory Maxi-blender) were mixed with polypropylene (added as powder or fibre) in a laboratory Maxi-Blender to replicate turbulent mixing in a flowing air/gas or steam stream, as experienced in a typical MDF line, for about 1-2 minutes. Unless stated otherwise the fibres were dried overnight at ~100° C. There are examples where such drying was not conducted.

For powder polymer mixes, MDF was added at normal speed for 1 minute, then the powder added over the next minute at high speed.

The mixed fibres-polymer combinations were then press moulded. A moulding box with cover metal plate was used and the fibre mixture distributed evenly within the moulding box. A plunger was inserted into the moulding box and pre-pressing was undertaken with a hydraulic jack. The jack was removed and the moulding box also removed. The plunger was removed and baking paper was placed on top of the pre-pressed mattress and a metal sheet on top. Spacers (for example, 3.1 mm) were then inserted on either side of the mattress, and the whole placed on a Siempelkamp press platten. A thermocouple was inserted into centre of the mattress and attached with adhesive tape. The mattress was pressed at 250 kN and 190 degrees C. until thermocouple read 180 degrees. After 30 seconds-3 mins at this temperature pressure was released. The panel was then removed from the press and placed back into the pre-press and left under pressure from the hydraulic jack to cool. Panels were cut into test samples (eg for flexural tests, width×length×thickness 12.5×130×mm) on table saw and labelled.

Samples were tested on an Instron 5566 at 1.3 mm/minute and at a span of 50 mm using midpoint loading test following the ASTM D790M flexural (bending) testing methods and on an CEAST Impact Tester (Notched Charpy Impact Strength standard).

| Specimen | | Average Value | Std. Dev |
|---|---|---|---|
| 20M1 | Modulus (GPa) | 4.42 | 0.65 |
| | Maximum Stress (MPa) | 40.75 | 7.43 |
| | Strain at Max Load (%) | 2.67 | 3.28 |
| | Impact Strength (J/m) | 155.03 | |
| | Density (g/cc) | 0.96 | 0.05 |
| 20M2 | Modulus (GPa) | 4.12 | 0.70 |
| | Maximum Stress (MPa) | 36.73 | 6.25 |
| | Strain at Max Load (%) | 2.11 | 0.55 |
| | Impact Strength (J/m) | 156.05 | 9.41 |
| | Density (g/cc) | 1.04 | 0.03 |
| 28CF | Modulus (GPa) | 3.40 | 0.44 |
| | Maximum Stress (MPa) | 36.29 | 5.50 |
| | Strain at Max Load (%) | 2.79 | 0.74 |
| | Impact Strength (J/m) | 136.74 | 13.95 |
| | Density (g/cc) | 0.98 | 0.04 |
| 37CF | Modulus (GPa) | 3.58 | 0.21 |
| | Maximum Stress (MPa) | 56.27 | 3.56 |
| | Strain at Max Load (%) | 3.26 | 0.24 |
| | Impact Strength (J/m) | 80.20 | 9.47 |
| | Density (g/cc) | 1.05 | 0.03 |
| 37CF2 | Modulus (GPa) | 4.24 | 0.27 |
| | Maximum Stress (MPa) | 58.03 | 5.69 |
| | Strain at Max Load (%) | 2.68 | 0.22 |
| | Impact Strength (J/m) | 76.21 | 3.59 |
| | Density (g/cc) | 1.00 | 0.03 |
| 37FH | Modulus (GPa) | 3.69 | 0.52 |
| | Maximum Stress (MPa) | 45.46 | 5.08 |
| | Strain at Max Load (%) | 2.90 | 0.73 |
| | Impact Strength (J/m) | 118.50 | 14.32 |
| | Density (g/cc) | 0.96 | 0.03 |
| 4MF1 | Modulus (GPa) | 2.99 | 0.18 |
| | Maximum Stress (MPa) | 58.24 | 6.07 |
| | Strain at Max Load (%) | 4.34 | 0.44 |
| | Impact Strength (J/m) | 100.39 | 24.95 |
| | Density (g/cc) | 0.95 | 0.03 |
| 4MF2 | Modulus (GPa) | 3.22 | 0.17 |
| | Maximum Stress (MPa) | 66.45 | 5.49 |
| | Strain at Max Load (%) | 3.95 | 0.37 |
| | Impact Strength (J/m) | 48.84 | 6.80 |
| | Density (g/cc) | 0.98 | 0.03 |
| 4MFLD | Modulus (GPa) | 1.83 | 0.26 |
| | Maximum Stress (MPa) | 33.69 | 5.18 |
| | Strain at Max Load (%) | 3.96 | 0.43 |
| | Impact Strength (J/m) | 50.75 | 3.68 |
| | Density (g/cc) | 0.70 | 0.05 |
| 4MFS | Modulus (GPa) | 1.74 | 0.19 |
| | Maximum Stress (MPa) | 46.50 | 3.51 |
| | Strain at Max Load (%) | 4.42 | 0.43 |
| | Impact Strength (J/m) | 58.45 | 4.15 |
| | Density (g/cc) | 0.92 | 0.03 |
| 4PLAF1 | Modulus (GPa) | 4.57 | 0.45 |
| | Maximum Stress (MPa) | 65.73 | 7.59 |
| | Strain at Max Load (%) | 2.63 | 0.15 |
| | Impact Strength (J/m) | 65.54 | 4.49 |
| | Density (g/cc) | 1.05 | 0.04 |
| 8MF1 | Modulus (GPa) | 3.06 | 0.24 |
| | Maximum Stress (MPa) | 62.80 | 5.71 |
| | Strain at Max Load (%) | 3.82 | 0.20 |
| | Impact Strength (J/m) | 44.95 | 6.24 |
| | Density (g/cc) | 0.94 | 0.05 |
| 8MF2 | Modulus (GPa) | 2.09 | 0.36 |
| | Maximum Stress (MPa) | 37.72 | 7.24 |
| | Strain at Max Load (%) | 4.17 | 0.55 |
| | Impact Strength (J/m) | 51.66 | 4.85 |
| | Density (g/cc) | 0.76 | 0.06 |
| CF1 | Modulus (GPa) | 3.12 | 0.23 |
| | Maximum Stress (MPa) | 56.80 | 5.48 |
| | Strain at Max Load (%) | 3.75 | 0.29 |
| | Impact Strength (J/m) | 57.62 | 10.79 |
| | Density (g/cc) | 0.97 | 0.02 |
| PFM1 | Modulus (GPa) | 1.86 | 0.24 |
| | Maximum Stress (MPa) | 42.78 | 3.17 |
| | Strain at Max Load (%) | 4.26 | 0.43 |
| | Impact Strength (J/m) | 75.89 | 49.78 |
| | Density (g/cc) | 0.95 | 0.04 |
| PFM2 | Modulus (GPa) | 1.71 | 0.19 |
| | Maximum Stress (MPa) | 39.67 | 2.64 |
| | Strain at Max Load (%) | 4.21 | 0.19 |
| | Impact Strength (J/m) | 80.45 | 5.42 |
| | Density (g/cc) | 0.94 | 0.05 |
| PPP1 | Modulus (GPa) | 2.01 | 0.25 |
| | Maximum Stress (MPa) | 40.37 | 3.42 |
| | Strain at Max Load (%) | 4.15 | 0.44 |
| | Impact Strength (J/m) | 40.23 | 6.95 |
| | Density (g/cc) | 0.98 | 0.02 |
| PPP2 | Modulus (GPa) | 1.70 | 0.14 |
| | Maximum Stress (MPa) | 31.89 | 3.02 |
| | Strain at Max Load (%) | 4.00 | 0.34 |
| | Impact Strength (J/m) | 88.84 | 5.61 |
| | Density (g/cc) | 0.94 | 0.04 |
| PPF | Modulus (GPa) | 1.29 | |
| | Maximum Stress (MPa) | 38.58 | |
| | Strain at Max Load (%) | 5.00 | |
| | Density (g/cc) | 0.86 | |

Sample Descriptions/Methods

20M1 20% Michem MAPP emulsion in MDF, Sample 1 (no Polypropylene or other polymer added)

20M2 20% Michem MAPP emulsion in MDF, Sample 2 (repeated; again no other Polypropylene or other polymer added)

28CF 80% MDF control 20% Polypropylene fibre.

37CF 70% MDF control 30% Polypropylene fibre (MDF fibre not pre dried; approx 6 wt % moisture content)

37CF2 70% MDF control 30% Polypropylene fibre repeat (fibre not pre-dried; approx 6 wt % moisture content)

37 FH 8% Michem MAPP, in MDF, 70% MDF fibre, 30% PP fibre.

4MF1 4% Michem MAPP emulsion in MDF, 40% MDF 56% Polypropylene fibre, Sample 1

4MF2 4% Michem MAPP emulsion in MDF, 40% MDF 56% Polypropylene fibre, Sample 2

4MFLD 4% Michem MAPP emulsion in MDF, 40% MDF 56% Polypropylene fibre, Low Density = 0.7 g/cc 4MFS 4% Michem MAPP emulsion in MDF, 40% MDF 56% Polypropylene sheet and fibre, using 0.8 mm outer Polypropylene sheets and Polypropylene fibre 4PLAF1 4% Michem MAPP emulsion in MDF, 40% MDF 56% Polylactic Acid fibre 8MF1 8% Michem MAPP emulsion in MDF, 40% MDF 52% Poloproplyene fibre, Sample 1

8MF2 8% Michem MAPp emulsion in MDF, 40% MDF 52% Poloproplyene fibre, Sample 2

CF1 40% MDF control 60% Polypropylene fibre

PFM1 4% Michem MAPP emulsion in MDF, 40% MDF 56% Polypropylene powder - 9048 (Natural) and sheet (0.38 mm sheets on outsides)

PFM2 4% Michem MAPP emulsion in MDF, 40% MDF 56% Polypropylene powder - 4610/05 (White) and sheet (0.38 mm sheets on outsides)

PPF Polypropylene fibre control

PPP1 4% Michem MAPP emulsion in MDF, 40% MDF 56% Polypropylene powder - 9048 (Natural)

PPP2 4% Michem MAPP emulsion in MDF, 40% MDF 56% Polypropylene powder - 4610/05 (White).

EXAMPLE 2

| Material composition | Pressing conditions | Density G/cm³ | Flexural Modulus (gpa) | Flexural strength (mpa) | Impact strength (j/m) |
|---|---|---|---|---|---|
| 4% Michem 26% PP fibre 70% MDF with 15% moisture content | 180-190 C./ 0.5-3 mins | 0.97 | 4.1 | 59.1 | 78.7 |
| 4% Michem MAPP 26% PP fibre 70% MDF with 15% moisture content | 100 C., press then release ~10 s then 180-190 C./ 0.5-3 mins | 1.03 | 5.5 | 81.8 | 89.4 |
| 4% Michem MAPP 2% Epolene MAPP 54% PP fibre 40% MDF with 15% mc | 100 C., press then release ~10 s then 180-190 C./ 0.5-3 mins | 0.97 | 3.6 | 69.3 | 37.0 |
| 4% Michem 56% PP fibre 40% MDF with 15% moisture content | 100 C., press then release ~10 s then 180-190 C./ 0.5-3 mins | 0.96 | 3.4 | 66.3 | 37.9 |
| 4% Michem % Epolene G3105_24% PP fibre 70% MDF With 15% moisture content | 100 C., press then release ~10 s then 180-190 C./ 0.5-3 mins | 1.0 | 4.7 | 69.8 | 72.6 |
| 60% PP fibre 40% MDF with 10% moisture content | 100 C., press then release ~10 s then 180-190 C./ 0.5-3 mins | 1.01 | 4.0 | 65.7 | 43.5 |
| 4% Epolene MAPP powder 56% PP fibre 40% MDF with (10% moisture content MDF fibre) | 100 C., press then release ~10 s then 180-190 C./ 0.5-3 mins | 0.99 | 3.5 | 59.0 | 37.2 |
| Polypropylene fibre control (no MDF fibre) | Pressed at 180-190 C. | 0.9 | 1.3 | 38.6 | 40. |

Other panels or sheets were made by spraying 80-100 grams of a binder resin (eg PVA or polyolefin or polyolefin copolymer emulsion) onto 550 grams of fibre using the 500F MDF laboratory blender (Maxiblender), which uses air pressure to reproduce air turbulence, as in a blowline and blows fibres around or along a certain path, with resin application occurring via a nozzle or spray gun, forcing resin into the flowing fibre stream. 100 grams resinated fibre was then formed or pressed into a 255 mm×280 mm×2 mm (700 kg/m³) panel or sheet, akin to MDF manufacturing. The panels were cut into pieces for mechanical or other property testing. In other examples, PVA and MAPP Michem polypropylene emulsion) bonded MDF 2 mm panels were produced by spraying resin emulsions/dispersions onto 550 grams of fibre, in a flowing stream, using the 500F MDF Maxiblender to obtain a resin solids loading of either 4% or 8%. 100 grams of resin coated fibre was formed into a 255 mm×280 mm×2 mm (700 kg/m³) MDF panel.

EXAMPLE 3

MDF fibre, or impregnated/coated fibre—prepared as above using Michem 43040 polymer emulsion at on MDF fibres applied as a spray onto loose moving fibres being conveyed in a flowing air stream akin to the MDF process, in a Laboratory Maxiblender—was used in sheet mouldings.

The fibres or coated fibres were then combined with polypropylene fibres or powders added either to the flowing stream or at the end while assembling the fibre mattress, and applying evenly throughout.

The fibres had a moisture content of ~5-15 wt %.

The fibre-polymer combinations were then pressed in heated mould with a two stage pressing—first applying heat/pressure to ~100C and hold for a short time with pressure release and then, after a release of pressure heat (under pressure) to 180-190C to make final pressing.

EXAMPLE 4

MDF Manufacturing Pilot Plant Trials

Trials at an MDF pilot plant at NZ Forest Research Institute were undertaken using refiner-blowline polymer addition, as in the MDF or particleboard industries, for the production of fibre-polymer pellet feedstocks for use in plastic processes. Example trial fibres of thermo-mechanical pulp—MDF fibre were produced on the PAPRO pilot plant refiner at Forest Research, Rotorua. Fibre 129 had 4% Michem emulsion injected onto the fibre which was flowing in the blowline. The polypropylene (PP) reference resin used was Hyundai Séetec grade M1600 supplied as pellets. The maleic anhydride modified polypropylene emulsion used was Michem 43040 (a non-ionic emulsion) supplied by Michelman Inc.

Fibre from wood chips was produced in the Forest Research Mechanical Pulping Pilot Plant under typical conditions for high temperature/mechanical pulps, as used in MDF industry.

Michem 43040 emulsion was added to hot fibre in the MDF refiner-blowline and dried at 140° C. in a tube drier to a targeted moisture content of 12 to 16%. The MDF fibre was pressed into two millimetre thick 300×300 mm panels at three densities (500, 700 and 900 kg/m³).

The results indicate that the addition of an emulsified coupling agent or binder to the blowline of a commercial MDF plant in a process representative of commercial MDF or particleboard manufacturing, will give a similar performance to the laboratory examples earlier.

The binder or coupling agent may be added at various points in the refiner-blowline process and could be added at the refiner, or at various points along the blowline. Two or more points of addition may be used to apply the same or different polymers or additives sequentially.

Approximately 20 kg of coated fibres for each ran was dried using the MDF drying tube to blow hot (140-160° C.) air onto fibre that was collected with a cyclone dropping the fibre into a plastic bag.

The fibre was measured for moisture content and adjustments made to correct for variation in moisture content. Michem 43040 was added to hot fibre at the MDF refiner blowline and coated fibre was dried at 140° C. to a targeted moisture content of 12 to 16%. The MDF fibres were pressed into two millimetre thick 300×300 mm panels at three densities (500, 700 and 900 kg/m³) at 180C.

The samples produced are listed below in Table below.

TABLE

List of MDF fibre-plastics made in Pilot Plant Refiner.

| Label | Description of Fibre and Coupling Agents | Density of 2 mm Panel/Sheet (kg/m³) |
|---|---|---|
| 500M4 | Run 129 4% Michem addition | 500 |
| 700M4 | Run 129 4% Michem addition | 700 |
| 900M4 | Run 129 4% Michem addition | 900 |

[b] applied by spraying onto fibre

500M4-900M4: MDF fibres as above, pressed in the presence of 4% Michem G3015 coupling agent that was added in the blowline. Fibre hot-pressed at 180° C. for 1 minute to different densities.
Sample Densities The densities of the MDF filled polypropylene composites are given below in the Table below.

TABLE

Densities of MDF filled polypropylene samples

| Label FR Refiner/Blowline | Density Kg/m3 |
|---|---|
| 500M4 | 1047 |
| 700M4 | 1054 |
| 900M4 | 1060 |
| PP (reference) | 890 |

The addition of Michem 43040 binder usually improved the strength of MDF fibre/polypropylene. MDF type sheet made with the polypropylene emulsion at various densities were able to be manufactured.

EXAMPLE 5

Further MDF Manufacturing Pilot Plant Trials

Further trials at an MDF pilot plant at NZ Forest Research Institute were undertaken using refiner-blowline polymer addition, as in the MDF or particleboard industries, for the production of fibre-polymer pellet feedstocks for use in plastic processes. Example trial fibres of thermo-mechanical pulp—MDF fibre were produced on the PAPRO pilot plant refiner at Forest Research, Rotorua.

Fibres were coated with a variety of emulsions or polymer dispersions at various loadings injected onto the wood fibre, which was flowing in the blowline. In addition further trials were conducted in the same way using the same wood fibre source but using neat polymers (little or no significant water or solvent present). These polymers were injected as molten polymers or as formulated polymer mixtures or as waxes, or formulated hot melts which were heated or softened such that they could be injected into the blowline via application of a pump designed for hot-melt pumping or injection or a wax melter-pump system.

Fibre from wood chips was produced in the Forest Research Mechanical Pulping Pilot Plant under typical conditions for high temperature/mechanical pulps, as used in MDF industry.

The emulsions or dispersions were added to hot fibre in the MDF refiner-blowline and dried at 140° C. in a tube drier to a targeted moisture content of 12 to 16%. The MDF fibre was successfully coated in laodings up to 40 wt % polymer The coated fibres were subsequently pressed into two millimetre thick 300×300 mm panels.

The results indicate that the addition of an emulsified thermoplastic polymer and/or coupling agent or binder to the blowline, such as a blowline of a MDF or particleboard mill or manufacturing process, could be achieved, and at surprisingly high polymer loadings. Inspection of the tubes and driers etc at the end of the experiments revealed little or no deposition of polymer on the walls thus proving that all polymer was successfully applied to the fibre. This was further supported by observations of the fibres, where polymer coating could be readily observed with high loadings and from the panels or shapes manufactured from them. This is also further indicative that a fully commercial MDF plant, which this process is representative of, or a commercial particleboard manufacturing process, will give a similar performance.

The binder or coupling agent may be added at various points in the refiner-blowline process and could be added at the refiner, or at various points along the blowline. Two or more points of addition may be used to apply the same or different polymers or additives sequentially. A coupling agent (which may be emulsion or dispersion or molten or wax) may be added first followed by a matrix or other polymer (which may also be emulsion or dispersion or molten or wax).

Between 10-40 kg of variously coated fibres for each run was produced and dried using the MDF drying tube to blow hot (140-160° C.) air onto fibre that was collected with a cyclone dropping the fibre into a plastic bag. The fibre was measured for moisture content and adjustments made to correct for variation in moisture content. The MDF fibres were pressed into two millimetre thick 300×300 mm panels at three densities at 180C after pre-drying.

The samples produced are listed below in the Table below.

TABLE

List of MDF fibres coated with plastics made in Pilot Plant Refiner Trial.

| Fibre ID | | Nominal Loading OD % | Actual Loading measured OD % | Ex-refiner Sample size made OD kg |
|---|---|---|---|---|
| 207 | Control (no added polymer) | 0 | 0 | 104 |

TABLE-continued

List of MDF fibres coated with plastics made in Pilot Plant Refiner Trial.

| Fibre ID | | Nominal Loading OD % | Actual Loading measured OD % | Ex-refiner Sample size made OD kg |
|---|---|---|---|---|
| 208 | Maleic anhydride-polypropylene emulsion: Michem 43040 emulsion | 2 | 1.9 | 44 |
| 209 | | 4 | 3.7 | 104 |
| 210 | | 6 | 5.6 | 35 |
| 211 | Ethylene Acrylic Acid Emulsion: EAA Prime Emulsion | 4 | 3.7 | 82 |
| 212 | | 8 | 7.4 | 86 |
| 213 | Licowax neat polypropylene | 10 | 10.2 | 19 |
| 214 | | 20 | 20.4 | 24 |
| 215 | | 30 | 30.6 | 27 |
| 216 | | 40 | 40.8 | 22 |
| 218 | PEMA 4351: neat ethylene- maleic anhydride copolymer | 8 | 10.5 | 46 |
| 219 | | 4 | 5.3 | 38 |
| 220 | PP 1302 - neat low melting polypropylene | 10 | 10.2 | 42 |
| 221 | | 20 | 20.4 | 26 |

A major advantage of a preferred embodiment of the invention is to provide a convenient method to manufacture wood fibre reinforced thermoplastic polymer sheets or moulded products, and using low bulk density fibres such as MDF fibres or other similar fibres, such fibres and sheets/products being readily manufactured in MDF type processes which are convenient, high volume, very cost effective, processes for conversion of wood or other resources into high quality fibrous or composite products.

The examples above show that pressed bound fibres with or without added plastic (for example in the form of powder or fibre or film) can be used to produce fibre reinforced polymer sheets which may also be subsequently thermoplastically processed if desired or reprocessed or recycled, and achieve good performance.

Composite samples prepared with the MDF fibre were examples of the invention. The PVA bonded example illustrates that other resins can be used. The use of alternative, more polar, matrix and/or added coupling in the matrix can be used to improve the overall performance in using PVA, or other adhesively bonded MDF. The use of PVA and Michem adhesives to bind MDF fibres into sheets were applied via an example of the process of the invention to the MDF fibre composites.

The addition of Michem (via precoating, sheet-making) increased the stress above that of unfilled polypropylene. The examples described represent examples of the invention in a preferred mode, wherein the binder is applied can also act as compatibiliser and is compatible with the thermoplastic polymer. Superior properties are often observed.

In the samples above the polymers could reasonably be replaced with any polymer which can be applied as a solution, dispersion or emulsion or as a neat liquid, molten wax or molten polymer or as a molten hot melt formulation as in a hot melt adhesive, a plasticised polymer, or a hot melt elastomer formulation.

Biopolymers such as starches, poly lactic acids, plasticized and formulated starches, polylactic acids (PLA), polyhydroxyalkanoates, (PHAs) and blends containing either one or more of these biopolymers are suitable, and blends with resin acids, pine resins, proteins,—with or without water and/or added plasticising solvents such as glycerol, citrate or succinate esters, lactic acid or lactate esters, lactides, amino acid, peptides; polyvinyl alcohol polymers, copolymers and derivatives; fatty acid esters and derivatives, polyalkylene oxides.

Thus, the invention has provided a convenient route to introducing fibres and compatibiliser into thermoplastic wood fibre sheets or products via the use of precoated fibres (prepared by essentially an MDF-type refining and impregnation process) followed by pressing or forming of the MDF-polymer sheet.

Thus, in summary the use of longer aspect ratio fibres (eg MDF fibres) manufactured as sheets or related products with compatibiliser, manufactured and introduced via the methods of the invention lead to good performance in strength and stiffness and are thermoplastically reprocessable. Even uncompatibilised (for PP matrix) fibre-polymer sheets could be thermoplastically formed and reprocessed or reshaped.

The invention claimed is:

1. A process for producing a thermoformable fibre-plastics composite product comprising fibres of a lignocellulosic material or natural fibres, comprising:
    conveying loose or divided fibres or fibre bundles, produced by mechanically or thermomechanically or chemo-thermomechanically or chemo-mechanically breaking down a lignocellulosic material, or natural fibres, in a dry or wet air stream and applying to or intimately mixing with the fibres while so conveying the fibres sufficient of one or more thermoplastic binding agents in a liquid formulation or particulate form to enable, after subsequently forming the fibres into a solid panel, said panel to be thermoformed to a different shape, and
    so forming the fibres into a solid thermoformable panel having a density of about 500 kg/m$^3$ or more by hot pressing the fibers.

2. A process according to claim 1 including subsequently heating and thermoforming said panel to thereby alter the shape of the panel.

3. A process according to claim 1 wherein said step of so forming the fibres into a solid thermoformable panel comprises forming the fibres into a substantially planar panel, and including the subsequent step of heating and thermoforming said panel or a part thereof into a non-planar shape.

4. A process according to claim 1 wherein said step of so forming the fibres into a solid panel comprises directly forming the fibres into a panel having a non-planar shape.

5. A process according to claim 4 including forming the fibres directly into a predetermined panel shape useful in manufacture without requiring further thermoforming.

6. A process according to claim 1 including introducing the binding agent in a liquid form into the interior of a conduit as the fibres move through the conduit, to coat or partially coat the fibres.

7. A process according to claim 6 including introducing the binding agent in a liquid form into the conduit by spraying the binding agent into the interior of the conduit as the fibres move through the conduit, to coat or partially coat the fibres.

8. A process according to claim 6 including introducing the binding agent in a liquid form into the conduit as a molten flow of the binding agent into the interior of the conduit as the fibres move through the conduit, to coat or partially coat the fibres.

9. A process according to claim 6 wherein the conduit conveys the fibres from a refiner stage in a plant for manufacture of fibre board.

10. A process according to claim 6 wherein the conduit conveys the fibres to or from a drying stage or drier.

11. A process according to claim 6 including conveying the fibres while wet.

12. A process according to claim 6 including conveying the fibres at an elevated temperature at which the thermoplastic binding agent remains liquid or molten after being applied to or mixed with the fibres.

13. A process according to claim 6 including forming the fibres into a thermoformable panel by compressing the fibres to the thermoformable panel.

14. A process according to claim 13 including pressing the fibres between heated plattens.

15. A process according to claim 1, wherein the fibres have an average fibre length or fibre-bundle length of at least about 0.8 mm.

16. A process according to claim 1, wherein a major fraction of the fibres have an aspect ratio of at least 10:1.

17. A process according to claim 1, wherein a major fraction of the fibres have an aspect ratio of at least 20:1.

18. A process according to claim 1 wherein the fibres are wood fibres.

19. A process for producing a thermoformable fibre-plastics composite product comprising:
    conveying loose or divided fibres or fibre bundles, produced by mechanically or thermomechanically or chemo-thermomechanically or chemo-mechanically breaking down a lignocellulosic material, in a dry or wet air stream and applying to the fibres while so conveying the fibres sufficient of one or more thermoplastic binding agents to enable, after subsequently forming the fibres into a solid panel, said panel to be thermoformed to a different shape,
    so forming the fibres into a solid thermoformable substantially planar panel having a density of about 500 kg/m$^3$ or more by hot pressing the fibers, and
    heating and thermoforming said panel or a part thereof into a non-planar shape.

20. A process for producing a thermoformable fibre-plastics composite product comprising:
    conveying loose or divided fibres or fibre bundles, produced by mechanically or thermomechanically or chemo-thermomechanically or chemo-mechanically breaking down a lignocellulosic material, in a dry or wet air stream and applying to the fibres while so conveying the fibres sufficient of one or more thermoplastic binding agents to enable, after subsequently forming the fibres into a solid panel, said panel to be thermoformed to a different shape, and
    so forming the fibres directly into a solid panel having a predetermined shape useful in manufacture and having a density of about 500 kq/m$^3$ or more by hot pressing the fibers without requiring further thermoforming.

21. A process for producing a thermoformable particulate-plastics composite product comprising particles of a lignocellulosic material or natural material, comprising:
    conveying particles of a lignocellulosic material, or natural material, in an air stream and applying to or intimately mixing with the particles while so conveying the particles sufficient of one or more thermoplastic binding agents in a liquid formulation or particulate form to enable, after subsequently forming the particles into a solid panel, said panel to be thermoformed to a different shape, and
    so forming the particles into a solid thermoformable panel having a density of about 500 kg/m$^3$ or more by hot pressing the particles.

22. A process for producing a thermoformable particulate-plastics composite product comprising particles of a lignocellulosic material or natural material, comprising:
    conveying particles of a lignocellulosic material, or natural material, in a dry or wet air stream and applying to the particles while so conveying the particles sufficient of one or more thermoplastic binding agents to enable, after subsequently forming the particles into a solid panel, said panel to be thermoformed to a different shape, and
    so forming the particles into a solid thermoformable substantially planar panel having a density of about 500 kq/m$^3$ or more by hot pressing the particles, and
    heating and thermoforming said panel or a part thereof into a non-planar shape.

23. A process for producing a thermoformable particulate-plastics composite product comprising:
    conveying particles of a lignocellulosic material in a dry or wet air stream and applying to while so conveying the particles sufficient of one or more thermoplastic binding agents to enable, after subsequently forming the particles into a solid panel, said panel to be thermoformed to a different shape, and
    so forming the particles directly into a predetermined shape useful in manufacture without requiring further thermoforming having a density of about 500 kq/m$^3$ or more by hot pressing the particles.

24. A process for producing a thermoformable composite product comprising fibres or particles of a lignocellulosic or natural material, which includes the steps of:
    conveying loose or divided fibres or fibre bundles, produced by mechanically or thermomechanically or chemo-thermomechanically or chemo-mechanically breaking down a lignocellulosic material, or natural fibres, or particles of a lignocellulosic or other natural material, in a dry or wet air stream and applying to or intimately mixing with the fibres or particles while so conveying the fibres or particles a thermoset binding agent, and
    so forming the fibres or particles into a solid panel having a density of about 500 kg/m$^3$ or more by hot pressing the particles at a temperature which only partially cures the thermoset binder such that the panel can subsequently be formed to a different shape with heat which will further cure the thermoset binder.

* * * * *